US00RE45679E

(19) United States
(12) Reissued Patent
Jones

(10) Patent Number: US RE45,679 E
(45) Date of Reissued Patent: Sep. 29, 2015

(54) CASINO STYLE GAME OF CHANCE APPARATUS

(71) Applicant: Mark H. Jones, Genoa, NV (US)

(72) Inventor: Mark H. Jones, Genoa, NV (US)

(21) Appl. No.: 13/679,362

(22) Filed: Nov. 16, 2012

Related U.S. Patent Documents

Reissue of:
(64) Patent No.: 8,113,516
Issued: Feb. 14, 2012
Appl. No.: 12/767,088
Filed: Apr. 26, 2010

U.S. Applications:
(63) Continuation-in-part of application No. 12/168,501, filed on Jul. 7, 2008, now abandoned, which is a continuation of application No. 09/810,800, filed on Mar. 15, 2001, now abandoned.

(60) Provisional application No. 60/189,544, filed on Mar. 15, 2000.

(51) Int. Cl.
*A63F 3/00* (2006.01)

(52) U.S. Cl.
CPC ..... *A63F 3/00* (2013.01)

(58) Field of Classification Search
USPC ..... 273/138.1, 142 E, 144 R
See application file for complete search history.

(56) References Cited

U.S. PATENT DOCUMENTS 2,385,980 A * 10/1945 Fostos ..... 273/399
4,185,828 A * 1/1980 Fernandez ..... 273/142 J
4,357,015 A 11/1982 Santora et al.
4,508,346 A 4/1985 Salvucci ..... 273/144 B
4,874,178 A 10/1989 Gage
5,039,101 A 8/1991 Potter
5,062,635 A 11/1991 Tse et al.
5,121,920 A * 6/1992 Laezzo et al. ..... 273/144 B
5,265,877 A 11/1993 Boylan et al. ..... 273/139
5,419,554 A * 5/1995 Krone et al. ..... 473/535
5,590,879 A 1/1997 Tripp ..... 273/144 R
6,152,448 A 11/2000 Cudlipp
6,168,155 B1 1/2001 Kuhlman et al.
6,688,597 B2 2/2004 Jones
7,775,521 B1 * 8/2010 Itkis et al. ..... 273/144 B

* cited by examiner

*Primary Examiner* — Vishu Mendiratta
(74) *Attorney, Agent, or Firm* — Dickinson Wright PLLC

(57) ABSTRACT

A casino style game apparatus preferably having a table layout for playing a roulette or roulette-like game without a roulette wheel. The preferred embodiment uses a ball blower to select a numbered ball from a set of thirty-eight numbered balls. A monitor displays the selected ball as viewed from a video camera mounted above the ball blower. The number displayed constitutes the random number decision generation replacing the use of a roulette wheel. An additional embodiment uses a random number generator to select a number from one to thirty-eight for random number decision generation. Another embodiment uses a shuffled thirty-eight card deck from which a numbered card is selected constituting the random number decision generation. An additional embodiment uses a remote control activated by a player to initiate the random number generator for selection of a number from one to thirty-eight to constitute the random number decision generation.

19 Claims, 11 Drawing Sheets

CASINO STYLE GAME OF CHANCE APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application is a continuation-in-part of Ser. No. 12/168,501, filed Jul. 7, 2008, which is a continuation of U.S. Utility application Ser. No. 09/810,800, filed Mar. 15, 2001, which claims the benefit of U.S. Provisional Application No. 60/189,544, filed Mar. 15, 2000.

BACKGROUND OF THE INVENTION

Field of the Invention

This invention relates in general to games of chance and more particularly to methods and a casino game apparatus having a roulette table layout played with conventional rules for roulette, except the game is played without a roulette wheel.

Casino games such as craps, roulette, poker and blackjack have become very popular over the years. They are popular with players and profitable for casinos. However, there are only a few places where people interested in such games can go to play because the games are not allowed in most states. Also, people are aware that roulette wheels can be made to favor particular results when rolled. Whether or not such roulette wheels are ever used in roulette games at casinos, players always have a lingering doubt that they might be, particularly since the odds always favor the casino. Therefore, a casino type roulette game that can be played with a roulette table layout, with roulette rules, and with all the fanfare, excitement and ambience that players expect and enjoy at a casino, but with a completely random method of determining the results of a play or spin, other than with the use of a roulette wheel, and for this reason may be played in more venues, is desired.

The apparatus of this invention uses a conventional roulette table, with a conventional roulette table layout, except it does not use a roulette wheel. However, since a roulette wheel is not used in the game, a minor variation is made in the layout or marked table surface. As will be explained in more detail later, the numbers "0" and "00" marked on the conventional roulette table layout could be replaced with the numbers "37" and "38".

The conventional roulette game uses a roulette ball which is dropped or spun into a spinning roulette wheel. As the wheel slows down, the ball eventually comes to rest in one of the numbered pockets positioned around a lower circumference of the inside of the wheel. This process of the ball landing in a numbered pocket is a means of generating a random number. The play of the game is based on this outcome of the spin of the roulette wheel, also known as a decision. Wagers can be made and each decision determines whether or not a player wins or loses, based on the rules.

To play the game of this invention without the use of a roulette wheel several means can be used to generate a decision. One way to generate a decision is by using a ball mixer/ blower, commonly used in bingo, the blower having balls numbered from one to thirty-eight. The number of the numbered ball selected by the ball blower would constitute a decision and the play of the game would continue based on this decision and the rules of the game. Another way of generating a decision is to use a deck of cards having thirty-eight cards, each marked with a separate, distinct number from one to thirty-eight, inclusive (representing the thirty-eight numbered pockets in a roulette wheel). The card deck would be shuffled by a card shuffler and one card would be dealt from the shuffler. The number of the card dealt would constitute a decision. Another way of generating a decision is to use a random number generator (hereafter ("RNG") to select a number from one to thirty-eight, inclusive, the number constituting a decision. Also, a player could be allowed to use a remote control to activate the RNG to select a number which would constitute a decision. A large monitor can be placed for players and observers to easily view the results of the selected number which would be displayed by the monitors.

Other advantages and attributes of this invention will be readily discernable upon a reading of the text hereinafter.

SUMMARY OF THE INVENTION

This invention describes a method for playing a game of chance using wagering rules similar to the traditional game of roulette. At least one defined set of balls is provided. The defined set consists of 37 or 38 individual and substantially identical balls. Each ball in the defined set represents a different chance outcome in the game having wagering rules similar to traditional roulette. Each ball in the defined set is marked with a distinctive indicium. Thirty-six of the balls in the defined set are marked with indicium selected from the group consisting of the whole numbers 1-36. The remaining one or two balls in the defined set are marked with other distinctive indicium. Every ball in the defined set is uniquely marked. A wagering area is provided having a layout region corresponding to the distinctive indicium marked on the balls and representing wagering options similar to the traditional game of roulette. The defined set of balls is placed in a generally transparent mixing chamber having an air outlet. A generally cylindrical calling unit is provided in communication with the air outlet of the mixing chamber. The calling unit has a generally transparent sidewall with an open lower end and a stopped upper end disposed outside of the mixing chamber. The calling unit is supported so that its cylindrical sidewall is maintained in a generally vertical orientation. Wagers are received upon the game outcome by positioning acceptable instruments within the layout region on the wagering area. The balls are agitated within the mixing chamber using an air current flowing toward the air outlet. An exclusive one ball is selectively admitted into the calling unit through its open lower end and then maintained inside the calling unit adjacent the stopped upper end. All of the wagers are resolved based on the distinct indicia marked on the exclusive one ball. The game decision is based on the step of admitting the exclusive one ball and the probability that any one distinct ball will be admitted into the calling unit is equivalent to one divided by the total number of balls in the defined set consistent with the conventional game of roulette. The exclusive one ball is returned to the mixing chamber, and then the steps of wagering, agitating, selectively admitting, maintaining, resolving and returning are repeated.

The invention according to this method provides an attractive, easy to implement casino game based on the traditional rules of roulette but without using a roulette wheel. A mixing chamber and vertically oriented calling unit are provided in the context of this method to enhance the game play experience as well a subtly underscore the veracity and trustworthiness of the game thus played.

According to another aspect of this invention, an apparatus is provided for playing a game of chance having wagering rules similar to the traditional game of roulette. A wagering area is provided for placing wagers thereon. The wagering area has a layout region including a layout matrix comprising 36 cells arranged in three columns and twelve rows, each cell containing a distinctive indicium selected from the group consisting of the whole numbers 1-36. At least one defined set of balls is provided. The defined set consists of 37 or 38 individual and substantially identical balls. Thirty-six of the balls are marked with a distinctive indicium selected from the group consisting of the whole numbers 1-36. The remaining one or two balls in the defined set are marked with other distinctive indicium. Every ball in the defined set is uniquely marked. A transparent mixing chamber contains the balls. The mixing chamber has an air inlet and an air outlet. A means is provided for randomly agitating the balls in the mixing chamber by an air current flowing toward the air outlet. A calling unit is in communication with the mixing chamber. The calling unit has a generally transparent cylindrical side wall with an open lower end and a stopped upper end disposed outside of the mixing chamber. The calling unit is supported in a generally vertical posture. A gate is disposed adjacent the open lower end of the calling unit and is movable between rest and displaced conditions for selectively admitting an exclusive one ball from the mixing chamber into the calling unit. A live motion camera is fixedly disposed relative to the calling unit and directed toward the transparent sidewall for capturing a live motion visual image of the exclusive one ball through the transparent sidewall. A video display is provided for displaying the live motion visual image of the exclusive one ball captured in real time by the live motion camera. The generally cylindrical shape of the calling unit combined with its generally vertical orientation provide an undistorted, generally equivalent multi-directional view of the exclusive one ball in the calling unit so that the visual image of the exclusive one ball on the video display appears substantially identical to the real life views of persons making and resolving wagers on the game outcome.

According to this aspect of the invention, the cylindrical shape of the calling unit sidewall permits use of a video camera in combination with game play for providing a live motion visual image of the one exclusive ball admitted to the calling unit which is both undistorted and generally equivalent to the view perceived by people dispersed about the game area making and resolving wagers on the game outcome.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
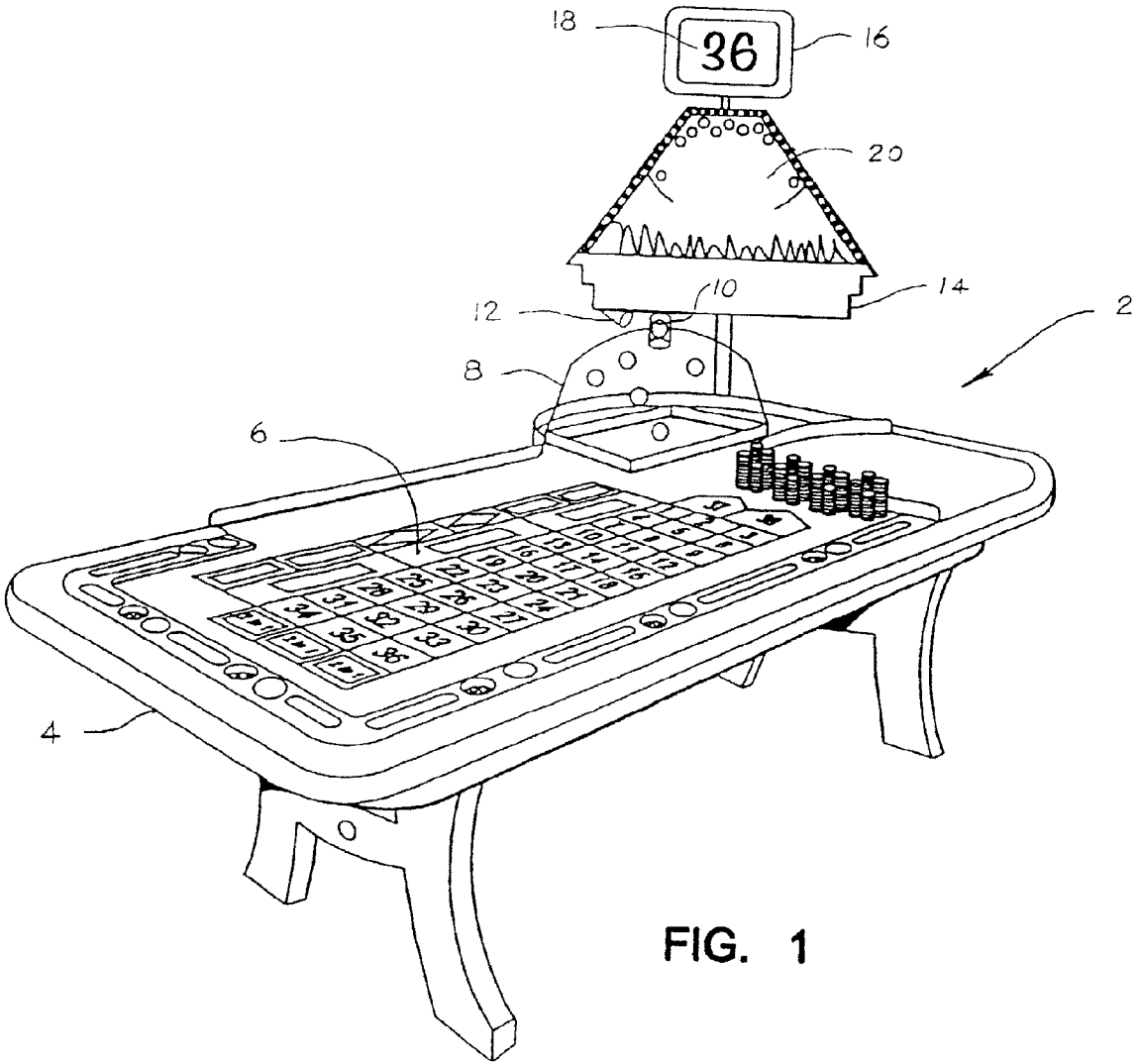
FIG. 1 is a pictorial view of the preferred embodiment of the invention.

Referring to FIG. 1, the preferred embodiment of the invention is shown and generally designated 2. A generally conventional roulette table 4 used in playing the casino game of the invention has a generally conventional roulette table layout 6. The principal difference from a conventional layout is that there is no roulette wheel. Additionally, the layout of this invention preferably replaces the numbers "0" and "00" of a conventional layout with the numbers "37" and "38". This is done because it is easier to have random number generators which can select numbers from the range of from one to thirty-eight, rather than to modify such a RNG to be able to select from the range of from one to thirty-six and "0" and "00". It is also somewhat easier to obtain balls for ball blowers and numbered card decks where the balls and cards are numbered from one to thirty-eight rather than including the numbers "0" and "00". This layout difference from the conventional roulette table layout applies to each of the embodiments described in more detail below.

Referring again to FIG. 1, a ball blower 8 is positioned on the table where a roulette wheel would otherwise be positioned. The ball blower is preferably of a type commonly used in bingo games where one of a set of light-weight, numbered, plastic balls can be randomly selected. The balls are kept in movement inside a transparent cover and, when the blower is activated, one ball nearest the entrance of a tubular ball calling unit (not shown) is selected by allowing the ball to enter the calling unit where it is blown to the top of the calling unit 10. In the top of the calling unit the ball can be viewed by the dealer and players and can also be viewed by a video camera 12. A display structure 14 is mounted above the ball blowers, preferably affixed to the table 4. A video camera 12 is affixed to the display structure above the ball blower 8 so the number on the ball selected by the ball blower can be viewed in the top of the calling unit 10 by the camera. A display monitor 16 is affixed to the display structure, positioned for easy viewing of the dealer, players and observers. The monitor displays the camera's view 18 of the selected ball in the top of the calling unit of the ball blower. The view 18 is the number marked on the ball that is in the top of the calling unit. The number displayed constitutes the random number decision generation replacing the use of a roulette wheel and play resulting from the decision will proceed according to the conventional roulette rules. Thus, instead of the number of a pocket in a roulette wheel in which a roulette ball comes to rest, it would be the number on the selected ball that would determine the play according to conventional roulette rules. The display structure 14 can contain signage 20 with flashing lights for adding additional casino atmosphere to the game.

The play is by roulette rules, with players making bets on the table layout 6. The ball blower 8 contains thirty-eight balls, each ball marked with a separate, distinct number from one to thirty-eight, inclusive. When the players have placed their bets, the dealer will start the ball blower which will cause the balls in the ball blower to be continually stirred. After the balls have been allowed to be stirred, the dealer will push a "select" button on his blower control unit (not shown) which will open access for the balls to the bottom of the calling unit. A blower forcing air up the calling unit will cause the next ball that passes the opening to the bottom of the calling unit to be forced up the calling unit where it can be observed in the top of the calling unit 10 by a video camera 12. The ball's number 18, as viewed by the camera will be displayed on the screen of a display monitor 16. The ball blower will select a numbered ball and the results of the selection will be displayed on the monitor for the dealer, players and observers. The number displayed constitutes the random number decision generation replacing the use of a roulette wheel and play resulting from the decision will proceed according to the conventional roulette rules. This would constitute a decision and the results of the numbered ball selected would be treated the same under the rules as if a roulette ball had come to rest on the equivalent number of a roulette wheel. The use of the ball blowers to select the random number decision generation creates a lottery style game, with no material difference from those used in many states having lotteries, including California.

Figure 2:
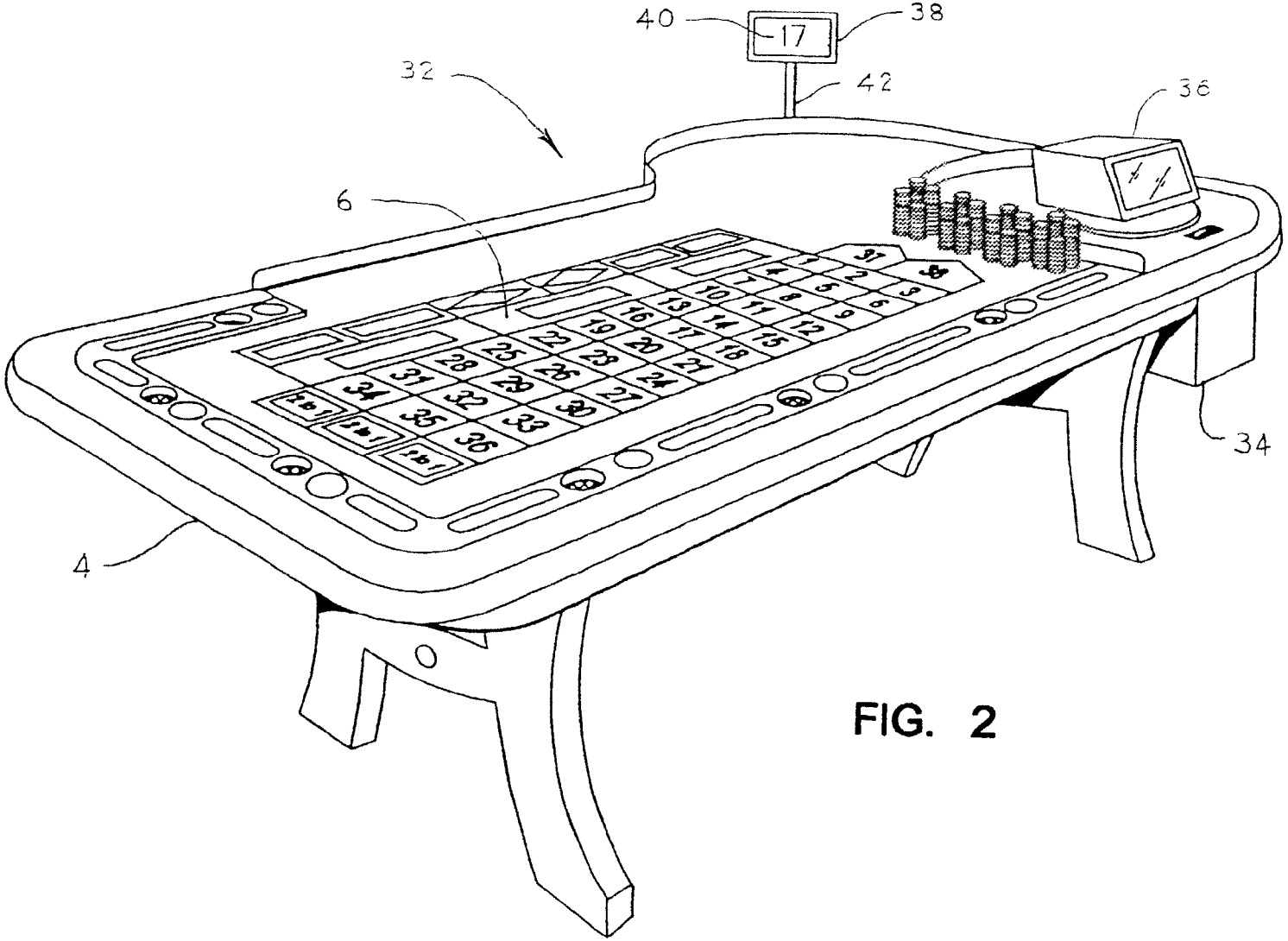
FIG. 2 is a pictorial view of another embodiment of the invention.

Referring to FIG. 2, another embodiment of the invention is generally designated 32. This embodiment uses the roulette table 4 having a roulette table layout 6 of the preferred embodiment. Since no roulette wheel is used in the game there is more space available on the table. In this embodiment there is a dealer's control unit 34 preferably affixed to an underside of the table. A monitor or CRT 36 is positioned on the table for the dealer. The control unit contains a small computer having software for random number generation of a number from one to thirty-eight, inclusive. The generation of the number will be based on the odds of picking one card from a thirty-eight card deck. At the dealer's signal, the random number generator software selects a random number within the range of from one to thirty-eight. The number is displayed on the screen of the CRT for the dealer and players to see. Also, a display monitor 38 displays the selected number 40 for players and observers to see. The monitor can be supported by a rigid hollow tube 42 affixed to the table. The monitor could also be mounted on a stand or other base placed some distance from the table. The control unit or enclosure affixed beneath the table would be locked and sealed by the gaming commission responsible for the play of such games prior to the start of play.

When the players have made their bets the dealer signals the control unit 34 to select a number. The software in the control unit has the random number generator select a random number from the range of from one to thirty-eight. The selected number 40 is displayed on the CRT 36 and the screen of a display monitor 38. The number displayed constitutes the random number decision generation replacing the use of a roulette wheel and play resulting from the decision will proceed according to the conventional roulette rules. This would constitute a decision and the results of the number selected would be treated the same under the rules as if a roulette ball had come to rest on the equivalent number of a roulette wheel.

Figure 3:
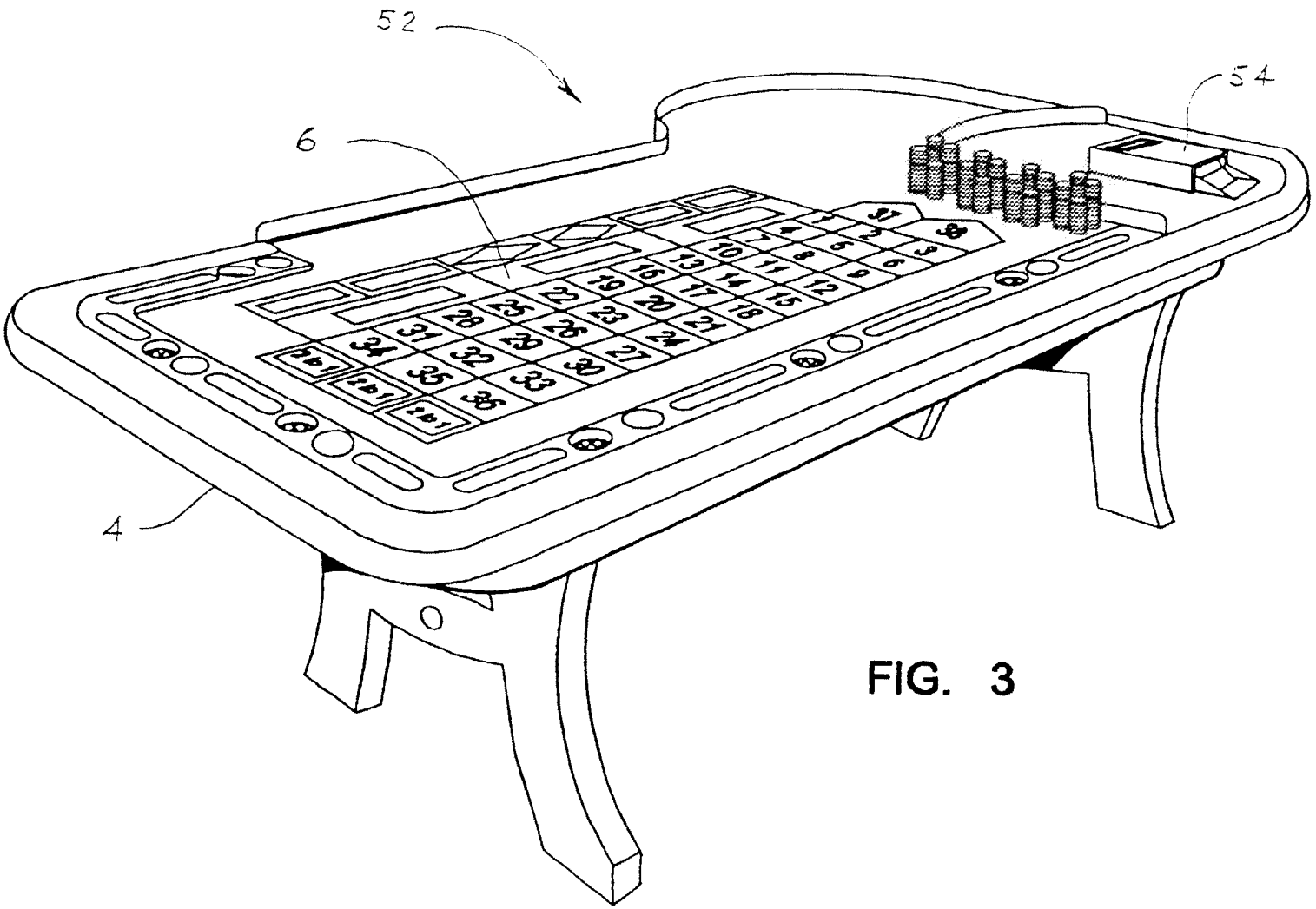
FIG. 3 is a pictorial view of another embodiment of the invention.

Referring to FIG. 3, another embodiment of the invention is generally designated 52. This embodiment uses the roulette table 4 having a roulette table layout 6 of the preferred embodiment. Since no roulette wheel is used in the game there is more space available on the table. In this embodiment a card shuffler 54 is used to provide the random number decision generation. The shuffler is positioned on the table for use by the dealer. A deck of thirty-eight cards (not shown) is used. The deck has cards bearing the numbers from one to thirty-eight, inclusive.

When the players have made their bets the dealer inserts the deck of cards into the shuffler. The shuffler thoroughly shuffles the cards and the dealer draws one card. The card is held or placed so the players and observers can see the card. The number displayed constitutes the random number decision generation replacing the use of a roulette wheel and play resulting from the decision will proceed according to the conventional roulette rules. This would constitute a decision and the results of the numbered card selected would be treated the same under the rules as if a roulette ball had come to rest on the equivalent number of a roulette wheel. While not shown, the invention encompasses the mounting of a video camera for viewing the card drawn by the dealer for displaying on the screen of a display monitor placed in position for the players and observers to see the results of the draw. By using cards the game becomes a house banked percentage card game.

Figure 4:
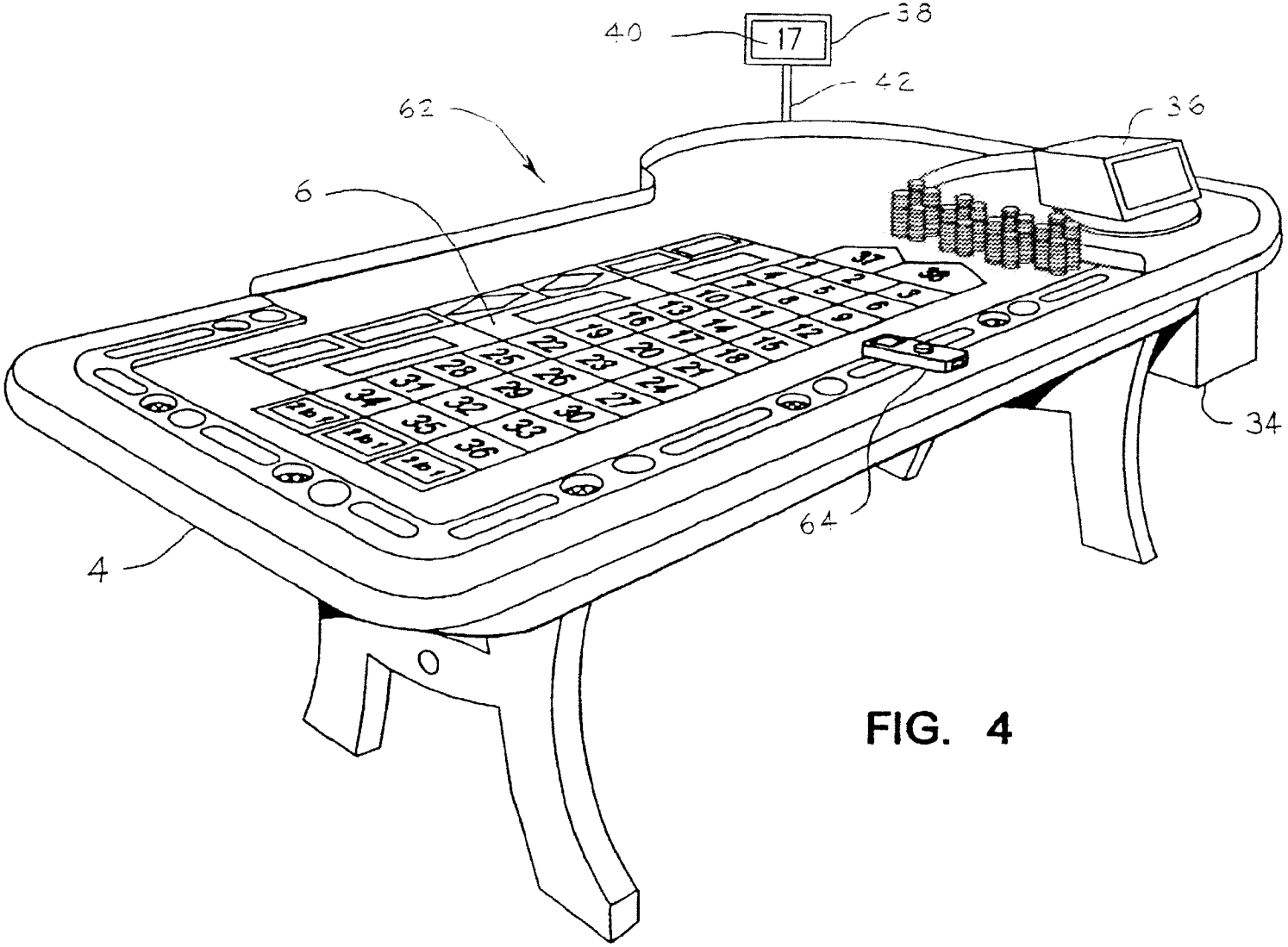
FIG. 4 is a pictorial view of another embodiment of the invention.
Figure 5:
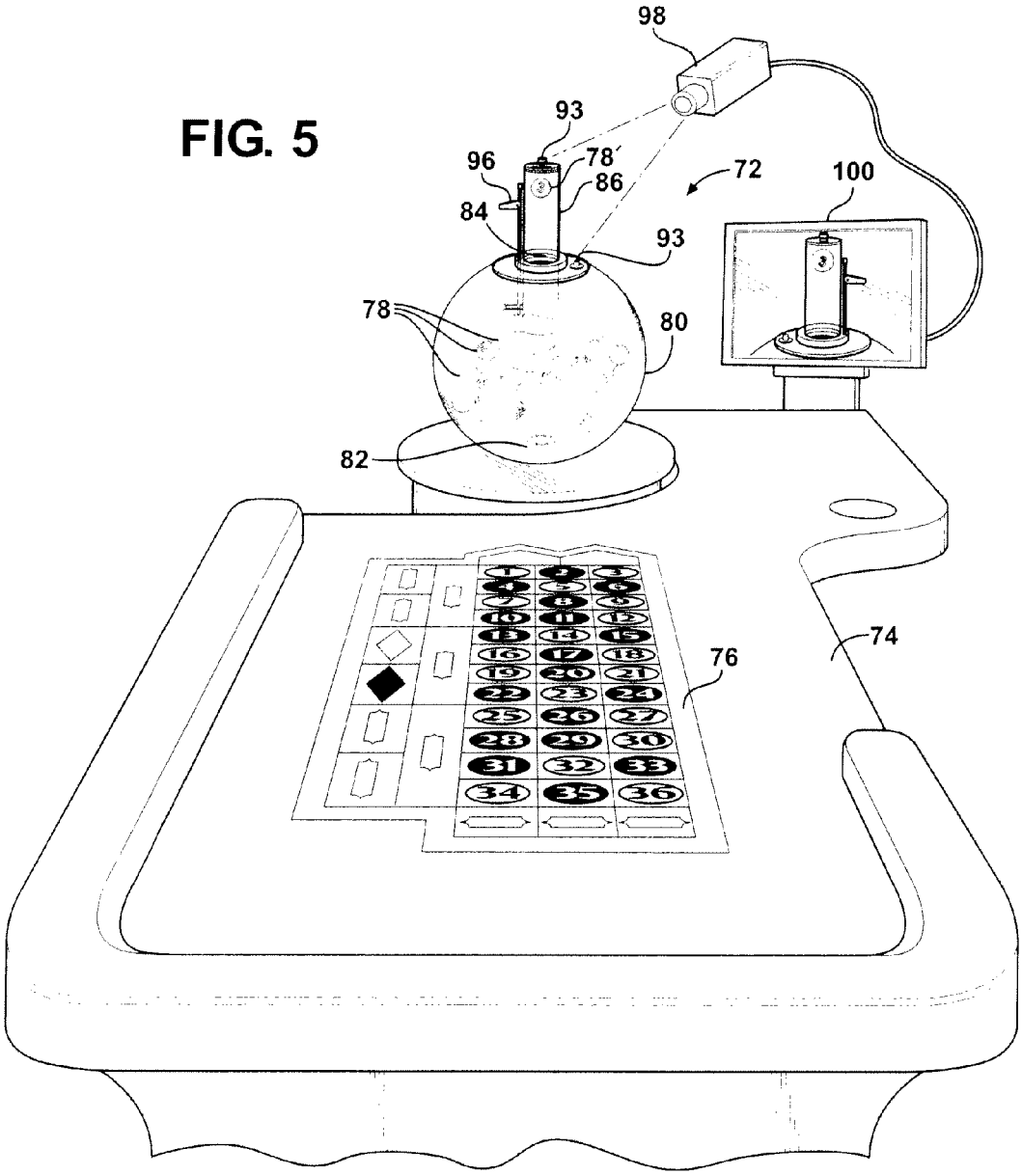
FIG. 5 is a view of the invention as in FIG. 1 but from a slightly different perspective and wherein the ball mixing chamber has an alternate configuration.
Figure 6:
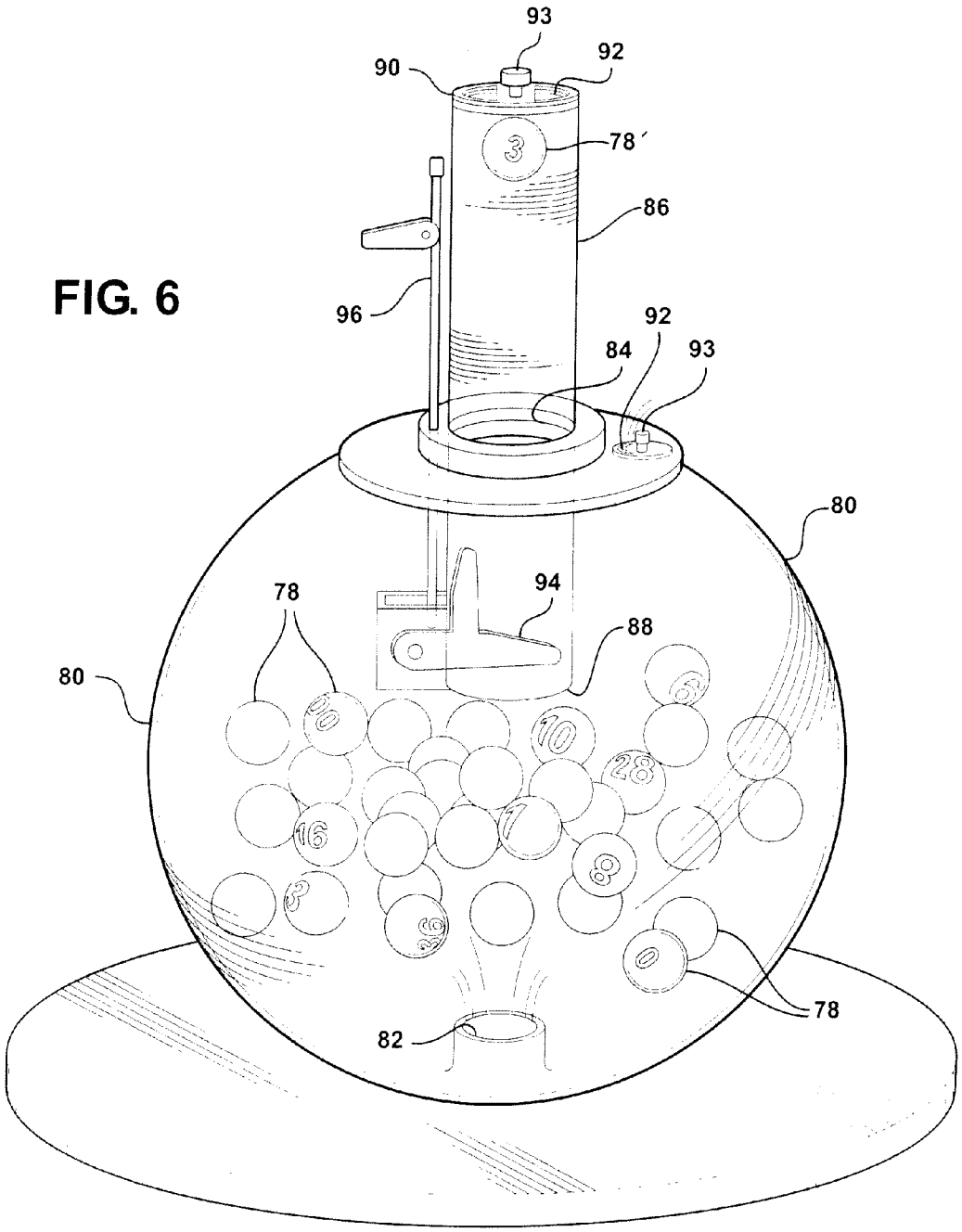
FIG. 6 is an enlarged view of the ball mixing chamber of FIG. 5.
Figure 7:
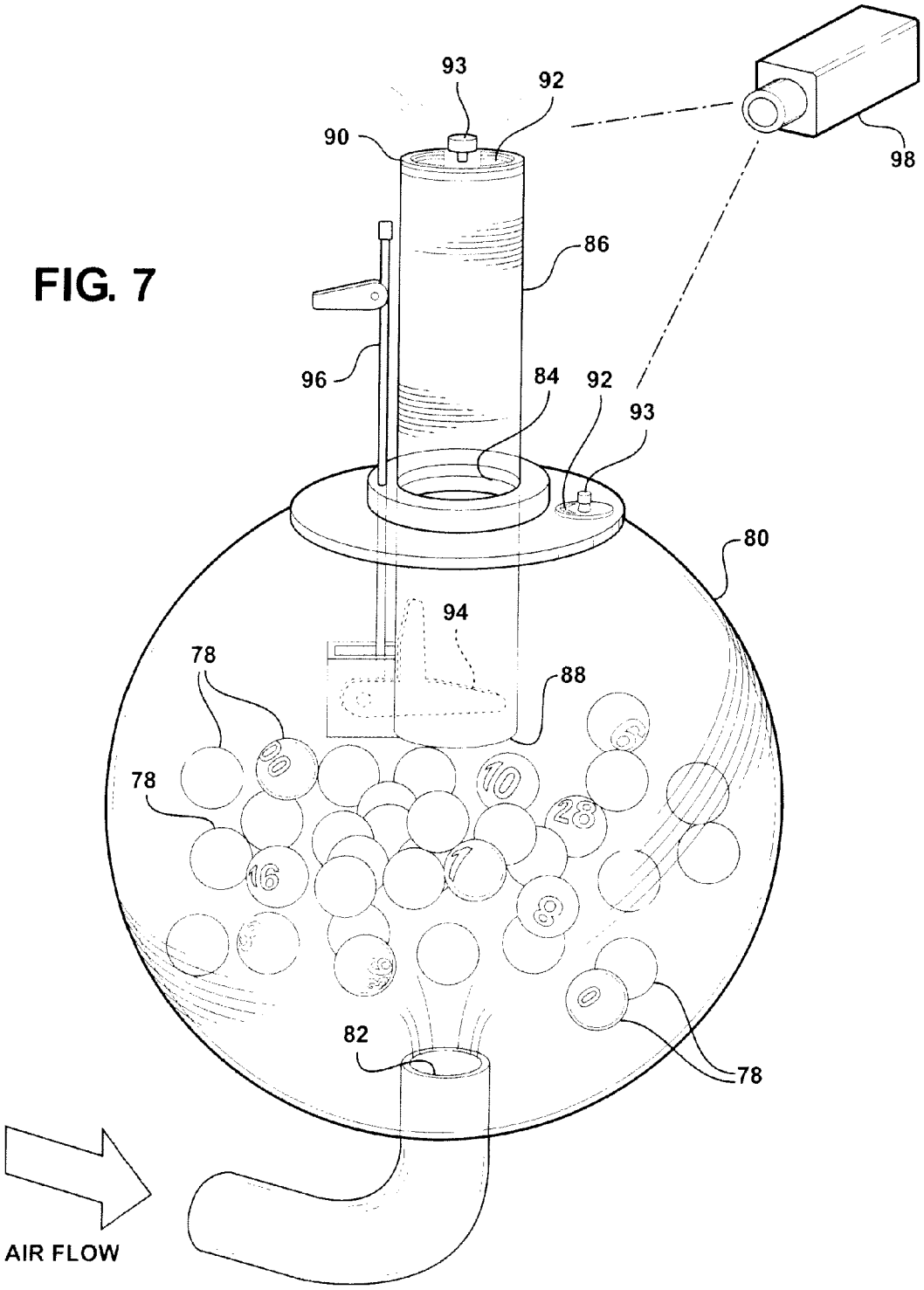
FIG. 7 is a simplified view of the ball mixing chamber and associated structure shown in FIG. 5 depicting the means by which balls in the mixing chamber are randomly agitated by a current of air flowing toward an air outlet.

Referring to FIG. 4, another embodiment of the invention is generally designated 62. This embodiment uses the roulette table 4 having a roulette table layout 6 of the preferred embodiment. Since no roulette wheel is used in the game there is more space available on the table. In this embodiment there is a dealer's control unit 34 preferably affixed to an underside of the table. A monitor or CRT 36 is positioned on the table for the dealer's use. The control unit contains a small computer having software for random number generation of a number from within the range of from one to thirty-eight, inclusive. The generation of the number will be based on the odds of picking one card from a thirty-eight card deck. To provide an increased sense of involvement for the players, a remote control 64 can be operated by a player. The remote control can communicate electrically with the control unit by means of a control cable (not shown), or wirelessly by means of electronic transmission, in similar fashion as a garage door opener's remote control communicates with the opener. The remote control would activate the random number generation software in the control unit to select a random number. The software would select a random number based on the odds of picking one card from a thirty-eight card deck. When the number is selected, it is displayed on the screen of the CRT for the dealer and players to see. Also, a display monitor 38 displays the selected number 40 on the screen of the display monitor for players and observers to see. The monitor can be supported by a rigid hollow tube 42 affixed to the table. The monitor could also be mounted on a stand or other base placed some distance from the table. The control unit or enclosure affixed beneath the table would be locked and sealed by the gaming commission responsible for the play of such games prior to the start of play.

When the players have made their bets the dealer would hand the remote control 64 to a player to initiate the play of the game. The player would press the button (not shown) on the remote control which would signal the control unit 34 to select a number. The software in the control unit has the random number generator select a random number from the range of from one to thirty-eight. The selected number 40 is displayed on the CRT 36 and the screen of a display monitor 38. The number displayed constitutes the random number decision generation replacing the use of a roulette wheel and play resulting from the decision will proceed according to the conventional roulette rules. This would constitute a decision and the results of the number selected would be treated the same under the rules as if a roulette ball had come to rest on the equivalent number of a roulette wheel.

Referring to FIGS. 5-10, yet another embodiment of the invention is generally shown at 72. This embodiment, similar in many respects to that shown in FIG. 1 and described above, utilizes a ball mixing technique to randomly select a number. A roulette table 74 provides a convenient wagering area for placing wagers in connection with a game of chance played in accordance with the traditional game of roulette, as described above. The wagering area has a layout region 76 including the traditional layout matrix comprising 36 cells arranged in three columns and twelve rows, each cell containing a distinctive indicium selected from the group consisting of the whole numbers 1-36. Additional wagering options are provided consistent with the conventional wagering rules of roulette. Of course, the wagering area and its associated layout region may be replicated in an electronic environment wherein an electronic display creates a layout region 76 on a computer monitor or other display device.

The apparatus 72 is played with at least one defined set of balls 78. Preferably, only one set of balls 78 is used. However, multiple sets can be employed without disturbing the odds necessary to play the game according to the conventional rules of roulette. Each defined set of balls 78 consists of thirty-seven or thirty-eight individual and substantially identical balls 78. As described previously, thirty-six of the balls 78 are marked with distinctive indicium selected from a group consisting of the whole numbers 1-36. The remaining one or two balls in the defined set are marked with other distinctive indicium, which may be the numbers 37 and 38, or more traditionally 0 and 00, for examples. Every ball 78 in the defined set is uniquely marked. Therefore, the chances that any one distinctive indicium will be selected by randomly drawing one ball 78' from the set is 1:37 or 1:38, depending upon the number of balls in the set.

A transparent mixing chamber 80 contains the balls 78. Preferably, the mixing chamber 80 is spherical or generally spheroidal in shape. However, other geometrical configurations may be employed so long as the random mixing of the balls 78 is not adversely affected. As perhaps best shown in FIG. 7, the mixing chamber 80 includes an air inlet 82 and an air outlet 84. In this example, the air inlet 82 is disposed at the bottom of the mixing chamber 80 and fed with a supply of air from a fan or blower assembly. The supply of air can be turned On and Off with a switch conveniently located by the dealer or game attendant. The air outlet 84 from the mixing chamber 80 is, in this example, at the diametrically opposite end of the spherical geometry. As an air current is moved through the mixing chamber 80, from the inlet 82 to the outlet 84, the balls 78 are randomly agitated due to their relatively light weight.

A calling unit 86 is in communication with the mixing chamber 80, and more particularly affixed to the air outlet 84 from the mixing chamber 80. The calling unit 86 has a generally transparent cylindrical sidewall with an open lower end 88 and a stopped upper end 90. Preferably, the open lower end 88 of the calling unit 86 is disposed inside the mixing chamber 80 near, and opening toward, the geometric center of the spherical mixing chamber 80. The stopped upper end 90 is disposed outside of the mixing chamber 80. The cylindrical sidewall of the calling unit 86 passes through the air outlet 84 of the mixing chamber 80, with the calling unit 86 being supported in a generally vertical posture. The calling unit 86 is provided with at least one exhaust vent 92 which directs the flow of air from the mixing chamber 80 upwardly through the calling unit 86. The vent(s) 92 may be formed directly in the sidewall of the calling unit 86, in the stopped upper end 90, or in combinations thereof. One or more control knobs 93 allow adjustment of the air flow through the vent(s) 92 to adjust the agitation intensity inside the mixing chamber 80 as well as the speed at which a singulated ball 78' is pushed to the upper end 90 of the calling unit 86.

Figure 8:
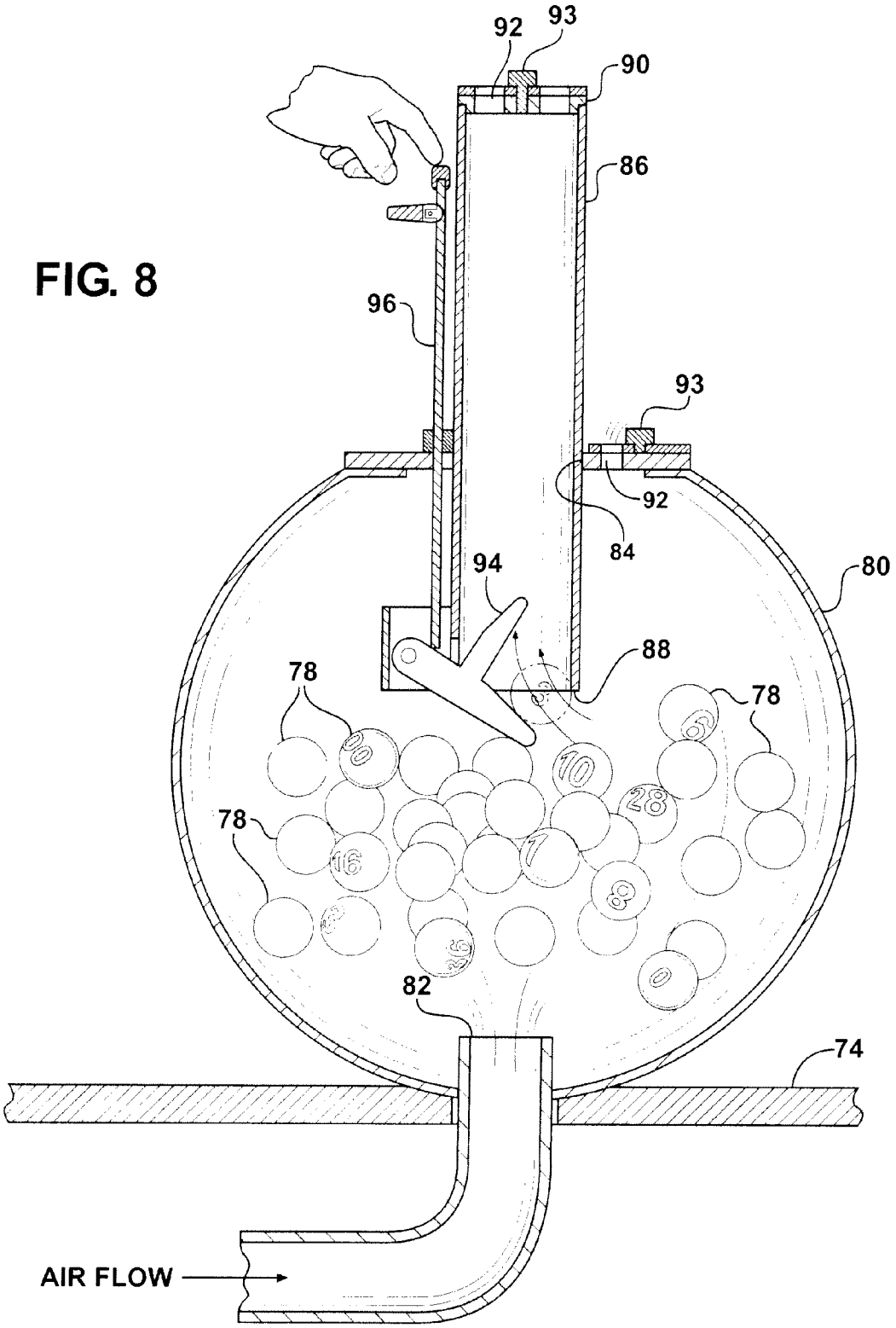
FIG. 8 shows the mixing chamber in cross-section with a gate feature associated with the ball selection calling unit being actuated so as to admit an exclusive one ball from the mixing chamber into the calling unit.
Figure 9:
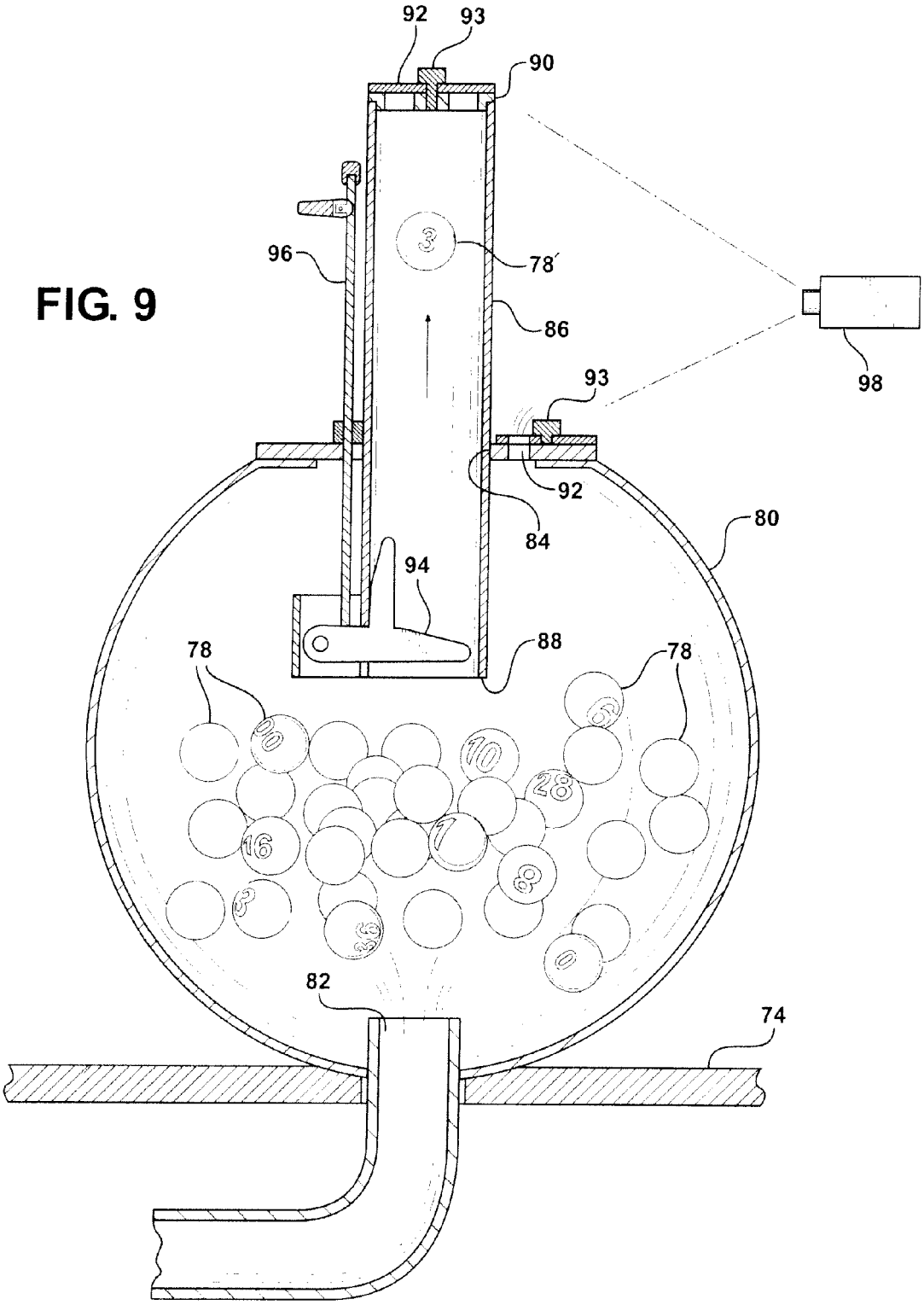
FIG. 9 shows an exclusive one ball admitted to the calling unit and maintained therein adjacent the stopped upper end while wagers are resolved.

An L-shaped gate 94 is disposed adjacent the open lower end 88 of the calling unit 86. The gate 94 is movable like a bell-crank between rest (FIGS. 7 and 9) and displaced (FIG. 8) conditions. When the gate 94 is moved to its displaced condition (FIG. 8), an exclusive one ball 78' from the mixing chamber 80 is admitted between the two legs of the L-shaped gate 94. When the gate 94 is in its rest position, one of these legs juts upwardly and the other leg extends into the cylindrical tube-like center region of the calling unit 86. By returning the gate 94 to its rest condition, the trapped ball 78' is then free to travel up into the calling unit 86 under the rushing air influence. The gate 94 is responsive to a manually actuated push rod 96 which extends partially into the mixing chamber 80. A return spring (not shown) is operatively coupled to the push rod 96 and/or the gate 94 so as to automatically return the gate 94 to its rest condition following actuation of the push rod 96. Thus, the gate 94 is held in a normally closed or rest condition and moves to the displaced condition only upon the application of sufficient force to the push rod 96, as shown in FIG. 8.

Figure 10:
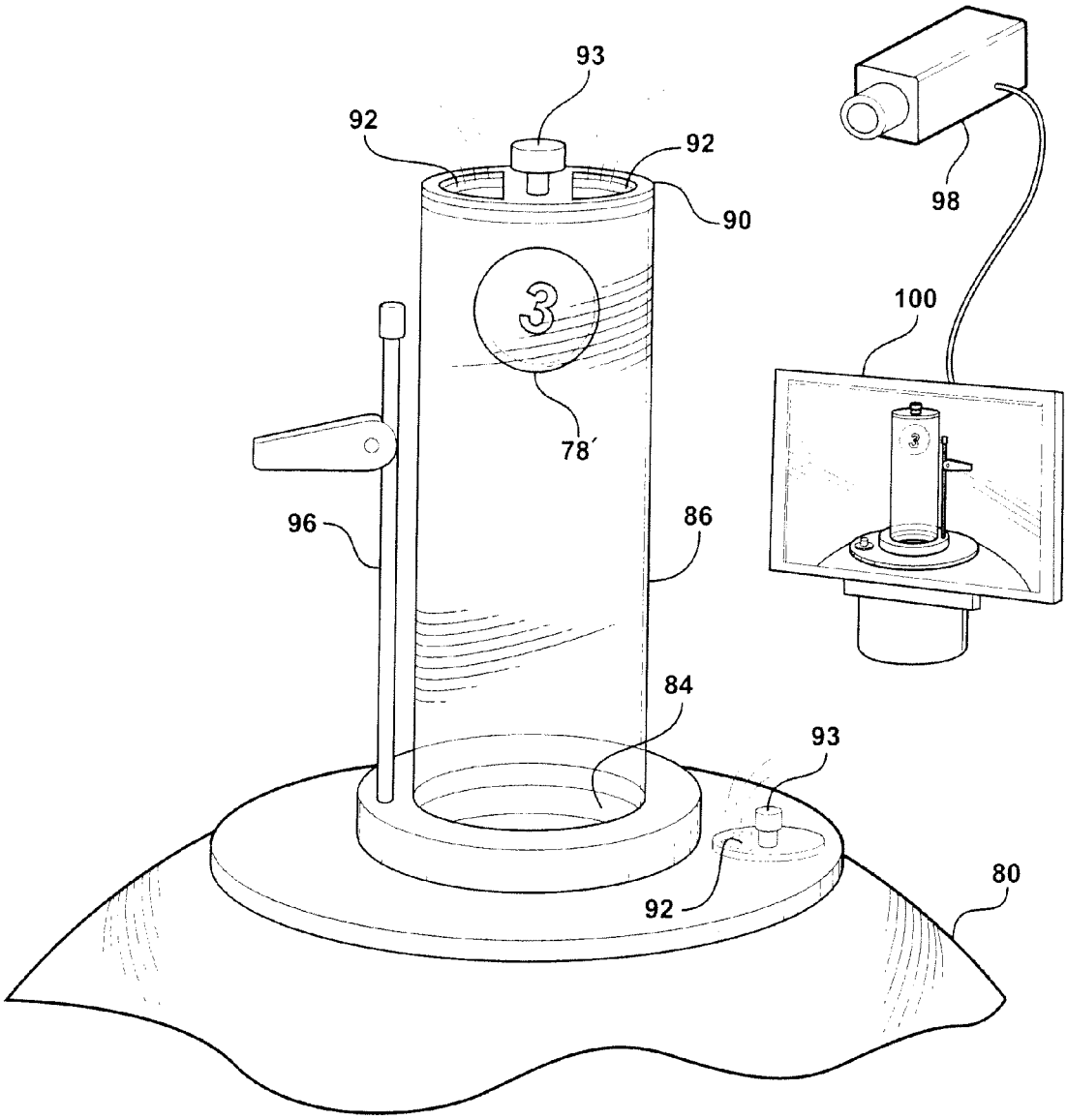
FIG. 10 is an enlarged view of the exclusive one ball captured in the upper end of the calling unit, together with a live motion picture camera capturing a live motion visual image of the ball and displaying the ball on a nearby displaced screen.

A live motion camera 98 is arranged relative to the calling unit 86 so as to capture a live motion visual image of the exclusive one ball 78' through the transparent sidewall of the calling unit 86. The camera 98 is fixed, i.e., immobile, relative to the calling unit 86. The camera 98 is operatively connected to a display monitor 100 as shown in FIG. 10 which is conveniently located for the viewing convenience of those people making and resolving wagers on the game outcome. The video display monitor 100 displays the live motion visual image of the exclusive one ball 78' captured in real time by the live motion camera 98. The generally cylindrical shape of the calling unit 86, combined with the generally vertical orientation thereof, provides ideal optics for the camera 98 in relation to the real life views of people dispersed about the roulette table 74. In other words, because of the transparent cylindrical sidewall of the calling unit 86, the view of the exclusive one ball 78' is substantially undistorted no matter where one stands about the roulette table 74 as well as to the camera's view projected onto the display monitor 100. As a result, a generally equivalent multi-directional view of the exclusive one ball 78' is provided, in substantially undistorted form, so that the video display on the display monitor 100 appears substantially identical in real life perspectives and on the display monitor 100. As a result, players making and resolving wagers on the game outcome will inherently trust the integrity of a game played according to this invention because the image on the display monitor 100 comports with the real life image. Therefore players feel confident to play the game for longer periods of time and on more frequent occasions.

Figure 11:
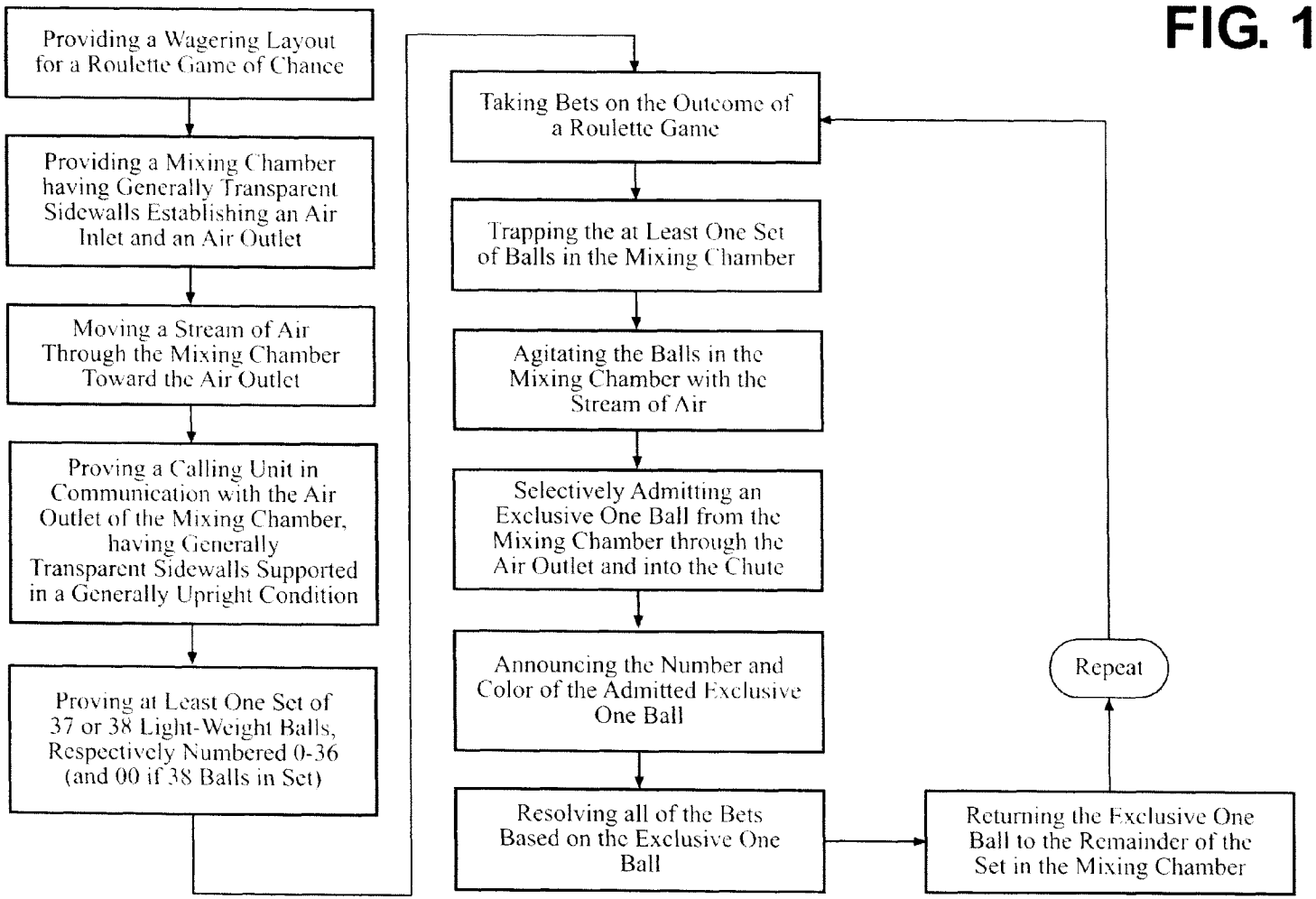
FIG. 11 is a simplified flow chart describing the steps of play for a game of chance according to one embodiment of the invention.

FIG. 11 provides, in simplified form, a flow chart describing the primary method steps of playing a roulette-style game of chance according to one embodiment of this invention. The method steps presented in FIG. 11 are substantially consistent with those described above. These steps include singulating one ball 78' from the mixing chamber 80, resolving all wagers on the basis of the one selected ball 78', and then directly returning the ball 78' to the mixing chamber without ever having touched the ball 78' with human hands. More specifically, after the game decision has been announced and wagers resolved, the air flow is temporarily stopped, causing the one exclusive ball 78' to fall down the calling tube. If the gate 94 is in its normal rest condition, its leg jutting into the calling unit 86 will arrest the ball 78'. A dealer or other game attendant will then depress the push rod 96, thus rotating the legs of the gate 94 and allowing the ball 78' to drop back down into the mixing chamber 80 and re-join the set of balls 78. When the air flow is restarted, all thirty-seven (or thirty-eight) balls 78 in the set are once again available to be selected in the next round of play. In other words, because a singulated ball 78' is directly returned to the mixing chamber 80 after it is announced, it is possible that the same ball 78 as previously selected can be admitted to the calling unit 86 in consecutive rounds of play.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims.

What is claimed is:

1. A method for playing a game of chance using wagering rules similar to the traditional game of roulette, said method comprising [the steps of]:

providing at least one defined set of balls, the defined set consisting of thirty-seven or thirty-eight individual and substantially identical balls, each ball in the defined set representing a different chance outcome in the game of chance having wagering rules similar to the traditional game of roulette;

marking each ball in the defined set with a distinctive indicium, thirty-six of the balls being marked with indicium selected from the group consisting of the whole numbers 1 to 36, and the remaining one or two balls in the defined set being marked with other distinctive indicium, whereby every ball in the defined set is uniquely marked;

providing a wagering area having a layout region corresponding to the distinctive indicium marked on the balls and representing wagering options similar to the traditional game of roulette;

placing the at least one defined set of balls in a generally transparent mixing chamber having an air inlet and an air outlet;

providing a [generally cylindrical] calling unit in communication with [the air outlet of] the mixing chamber, the calling unit [having a generally transparent sidewall with an open lower end and a stopped upper end disposed outside of the mixing chamber] *coupled to a gate, which is moveable between a resting position and a displaced position*;

[supporting the calling unit so that its cylindrical sidewall is maintained in a generally vertical orientation;]

wagering upon the game outcome by positioning an acceptable instrument within the layout region on the wagering area;

agitating the balls within the mixing chamber with an air current [flowing toward the air outlet];

selectively [admitting an exclusive one ball into the calling unit through the open lower end] *moving the gate to the displaced position to elevate an exclusive one ball with respect to the other balls in the mixing chamber using the calling unit* and then maintaining the *exclusive* one ball [inside the calling unit] adjacent [the stopped] *an* upper end *of the calling unit* while all of the other balls remain in *a lower portion of* the mixing chamber [and are positively excluded from entry into the calling unit];

resolving all of the wagers based on the distinct indicia marked on the exclusive one ball, whereby the game decision is based on said step of [admitting] *raising* the exclusive one ball *to the elevated position* and the probability that any one distinct ball will be [admitted into the calling unit] *raised to the elevated position* is equivalent to 1 divided by the total number of balls in the defined set consistent with the conventional game of roulette;

returning the exclusive one ball to the *lower portion of the* mixing chamber; and then repeating said steps of wagering, agitating, selectively [admitting] *raising*, maintaining, resolving and returning;

wherein said step of [selectively admitting an] *elevating the* exclusive one ball [through the open lower end of the calling unit includes displacing a gate; and wherein said step of displacing a gate] includes axially moving a push rod [operatively connected to the gate] *that is operably coupled to the gate*.

2. The method of claim [1] *17*, further [including the steps of] *comprising*:

providing a motion picture camera affixed relative to the calling unit and having an image capture zone including the portion of the sidewall extending outside of the mixing chamber;

capturing a live motion visual image of the exclusive one ball within the calling unit with the camera; and projecting the captured live motion image on a display screen, and simultaneously with said projecting step providing unobstructed, generally equivalent multidirectional viewing of the one singulated ball in the calling unit to the Dealer and all players and the camera so that the visual presentation of the live motion visual image appears substantially identical to the real life views of the Dealer and each player.

3. The method of claim [1] *18*, wherein the [gate has a rest condition preventing] *resting position of the gate prevents* movement of a ball there past, and wherein said agitating step is substantially uninterrupted as the gate moves between *the* displaced and [rest conditions] *resting positions*.

4. The method of claim [1] *3*, [wherein said step of displacing a gate includes] *further comprising:* pivoting the gate about a generally horizontal pivot axis *to move the gate between said displaced and resting positions*.

5. The method of claim [1] *17*, wherein said step of returning the exclusive one ball to the mixing chamber includes moving the ball downwardly though the calling unit and through the open lower end.

6. The method of claim [1] *17*, wherein said step of returning the exclusive one ball to the mixing chamber includes displacing [a] *the* gate disposed adjacent the open lower end of the calling unit.

7. The method of claim [1] *17*, wherein said step of returning the exclusive one ball to the mixing chamber includes interrupting the flow of air toward the air outlet.

8. The method of claim 1, wherein said step of agitating the balls within the mixing chamber with an air current includes adjusting the flow rate of the air current to alter the agitation intensity of the balls.

9. A method for playing a game of chance using wagering rules similar to the traditional game of roulette, said method comprising [the steps of]:

providing at least one defined set of balls, the defined set consisting of thirty-seven or thirty-eight individual and substantially identical balls, each ball in the defined set representing a different chance outcome in the game of chance having wagering rules similar to the traditional game of roulette;

marking each ball in the defined set with a distinctive indicium, thirty-six of the balls being marked with indicium selected from the group consisting of the whole numbers 1 to 36, and the remaining one or two balls in the defined set being marked with other distinctive indicium, whereby every ball in the defined set is uniquely marked;

providing a wagering area having a layout region corresponding to the distinctive indicium marked on the balls and representing wagering options similar to the traditional game of roulette;

placing the at least one defined set of balls in a generally transparent mixing chamber having an air inlet and an air outlet;

providing a [generally cylindrical] calling unit in communication with [the air outlet of] the mixing chamber[, the calling unit having a generally transparent sidewall with an open lower end and a stopped upper end disposed outside of the mixing chamber] *the calling unit being coupled to a gate which is moveable between a resting position and a displaced position*;

[supporting the calling unit so that its cylindrical sidewall is maintained in a generally vertical orientation;]

wagering upon the game outcome by positioning an acceptable instrument within the layout region on the wagering area;

agitating the balls within the mixing chamber with an air current [flowing toward the air outlet] *at a predetermined agitation intensity*;

selectively [admitting an] *moving the gate to the displaced position to elevate the* exclusive one ball [into] *with* the calling unit [through the open lower end] and then [maintaining] *maintain* the *exclusive* one ball in [inside] *an elevated position with* the calling unit adjacent [the stopped upper end while all of the other balls remain in the mixing chamber and are positively excluded from entry into the calling unit];

resolving all of the wagers based on the distinct indicia marked on the exclusive one ball, whereby the game decision is based on said step of admitting the exclusive one ball and the probability that any one distinct ball will be admitted into the calling unit is equivalent to 1 divided by the total number of balls in the defined set consistent with the conventional game of roulette;

returning the exclusive one ball to the mixing chamber; and then repeating said steps of wagering, agitating, selectively [admitting] *retaining*, maintaining, *raising,* resolving and returning;

[wherein said step of selectively admitting an exclusive one ball through the open lower end of the calling unit includes displacing a gate; and wherein the gate includes a pair of legs, and] wherein said step of selectively [admitting an] *maintaining the* exclusive one ball [to] *with* the calling unit includes trapping the ball [between the pair of legs] *and actuating a mechanical push rod operably coupled to the gate to effectuate vertical reciprocation of the gate within the mixing chamber*.

10. An apparatus for playing a game of chance having wagering rules similar to the traditional game of roulette, said apparatus comprising:

a wagering area for placing wagers thereon, said wagering area having a layout region including a layout matrix comprising thirty-six cells arranged in three columns and twelve rows, each said cell containing a distinctive indicium selected from the group consisting of the whole numbers 1 to 36;

at least one defined set of balls, each said defined set consisting of thirty-seven or thirty-eight individual and substantially identical balls, thirty-six of said balls marked with a distinctive indicium selected from the group consisting of the whole numbers 1 to 36, and the remaining one or two balls in said defined set marked with other distinctive indicium, whereby every ball in said defined set is uniquely marked;

a transparent mixing chamber for containing said balls, said mixing chamber having an air inlet and an air outlet;

[means] *a mechanism* for randomly agitating said balls in said mixing chamber by an air current [flowing toward said air outlet] *at a predetermined agitation intensity*;

a calling unit in communication with said mixing chamber[, said calling unit having generally transparent cylindrical sidewall with an open lower end and a stopped upper end disposed outside of said mixing chamber, said calling unit supported in a generally vertical posture] *and operably coupled to a gate which is moveable between a resting position and a displaced position*;

[a gate disposed adjacent said open lower end of said calling unit and moveable between rest and displaced conditions for] *a mechanism for adjusting the predetermined agitation intensity in order to* selectively [admitting] *retain* an exclusive one ball from said mixing chamber [into] *in communication with* said calling unit [while all of the other balls remain in said mixing chamber and are positively excluded from entry into said calling unit by said gate];

[a live motion camera fixedly disposed relative to said calling unit and directed toward said transparent sidewall for capturing a live motion visual image of said exclusive one ball through said transparent sidewall; and a video display for displaying the live motion visual image of said exclusive one ball captured in real time by said live motion camera, wherein said generally cylindrical shape of said calling unit combined with said generally vertical orientation thereof provide an undistorted, generally equivalent multidirectional view of said exclusive one ball in said calling unit so that the visual image of said exclusive one ball on said video display appears substantially identical to the real life views of persons making and resolving wagers on the game outcome;

further including a manually actuated pushrod operatively connected to said gate, said push rod extending partially into said mixing chamber] *a pushrod operably coupled to the gate to vertically reciprocate the gate between the resting and displaced positions such that the exclusive ball is disposed in a display condition by the calling unit*.

11. The apparatus according to claim 10, wherein said mixing chamber is generally spherical.

12. The apparatus according to claim 11, wherein a portion of said calling unit extends radially outwardly from said spherical mixing chamber.

13. The apparatus according to claim 10, wherein *the resting position of* said gate [has a rest condition preventing] *prevents* movement of a ball there past, and wherein said agitating step is substantially uninterrupted as the gate moves between its displaced and [rest conditions] *resting positions*.

14. The apparatus according to claim 10, further including at least one exhaust vent formed in said calling unit.

15. An apparatus for playing a game of chance having wagering rules similar to the traditional game of roulette, said apparatus comprising:

a wagering area for placing wagers thereon, said wagering area having a layout region including a layout matrix comprising thirty-six cells arranged in three columns and twelve rows, each said cell containing a distinctive indicium selected from the group consisting of the whole numbers 1 to 36;

at least one defined set of balls, each said defined set consisting of thirty-seven or thirty-eight individual and substantially identical balls, thirty-six of said balls marked with a distinctive indicium selected from the group consisting of the whole numbers 1 to 36, and the remaining one or two balls in said defined set marked with other distinctive indicium, whereby every ball in said defined set is uniquely marked;

a transparent mixing chamber for containing said balls, said mixing chamber having an air inlet and an air outlet;

[means] *a mechanism* for randomly agitating said balls in said mixing chamber by an air current [flowing toward said air outlet];

a calling unit in communication with said mixing chamber, said calling unit having [generally transparent cylindrical sidewall with an open lower end and a stopped] *an* upper end [disposed outside of said mixing chamber, said calling unit supported in a generally vertical posture];

a [gate disposed adjacent said open lower end of said calling unit and] *push rod operably coupled with a gate and being axially* moveable *to move the gate* between [rest] *resting* and displaced [conditions] *positions* for selectively [admitting] *elevating* an exclusive one ball from *a lower portion of* said mixing chamber [into said calling unit] while all of the other balls remain in said *lower portion of the* mixing chamber [and are positively excluded from entry into said calling unit by said gate];

[a live motion camera fixedly disposed relative to said calling unit and directed toward said transparent sidewall for capturing a live motion visual image of said exclusive one ball through said transparent sidewall; and a video display for displaying the live motion visual image of said exclusive one ball captured in real time by said live motion camera, wherein said generally cylindrical shape of said calling unit combined with said generally vertical orientation thereof provide an undistorted, generally equivalent multidirectional view of said exclusive one ball in said calling unit so that the visual image of said exclusive one ball on said video display appears substantially identical to the real life views of persons making and resolving wagers on the game outcome;]

wherein said [gate includes two legs offset from one another] *exclusive one ball is received between opposing structures*.

16. The apparatus according to claim 10, wherein said cell in said first column and said first row of said layout matrix includes the number "1", said cell in said second column and said first row includes the number "2", and said cell in said third column and said first row includes the number "3", and wherein each successive cell in each said column includes the number determined by the formula "n+3" where "n" is the number in the immediately preceding cell of the same column.

*17. The method of claim 1, wherein the calling unit has a generally transparent sidewall with an open lower end and an upper end disposed outside of the mixing chamber; and*

*wherein the calling unit is in communication with the air outlet of the mixing chamber.*

*18. The method of claim 17, further comprising:*

*disposing a gate adjacent the open lower end of the calling unit.*

*19. The method of claim 1, further comprising:*

*adjusting a predetermined agitation intensity of the air current to facilitate the exclusive one ball communicating with the calling unit.*

* * * * *